United States Patent
Rasmussen et al.

(10) Patent No.: US 12,355,241 B2
(45) Date of Patent: Jul. 8, 2025

(54) CAPACITOR COMPENSATED THYRISTOR CONTROLLED BRAKING RESISTOR

(71) Applicant: Hitachi Energy Ltd, Zürich (CH)

(72) Inventors: Jon Rasmussen, Västra Frölunda (SE); Gunnar Ingeström, Västerås (SE)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 18/699,844

(22) PCT Filed: Oct. 12, 2021

(86) PCT No.: PCT/EP2021/078192
§ 371 (c)(1),
(2) Date: Apr. 9, 2024

(87) PCT Pub. No.: WO2023/061561
PCT Pub. Date: Apr. 20, 2023

(65) Prior Publication Data
US 2024/0332966 A1    Oct. 3, 2024

(51) Int. Cl.
*H02J 3/00* (2006.01)
*H02J 3/18* (2006.01)

(52) U.S. Cl.
CPC ............ *H02J 3/00125* (2020.01); *H02J 3/18* (2013.01)

(58) Field of Classification Search
CPC ................................. H02J 3/00125; H02J 3/18
See application file for complete search history.

(56) References Cited

U.S. PATENT DOCUMENTS

| | | | | |
|---|---|---|---|---|
| 4,434,376 A | * | 2/1984 | Hingorani | H02J 3/1807 323/210 |
| 5,198,745 A | * | 3/1993 | Larsen | H02P 3/00 323/298 |

(Continued)

FOREIGN PATENT DOCUMENTS

| | | |
|---|---|---|
| CN | 101621203 A | 1/2010 |
| CN | 105720588 A | 6/2016 |

(Continued)

OTHER PUBLICATIONS

Okedu, Enhancing the performance of DFIG variable speed wind turbine using a parallel integrated capacitor and modified modulated braking resistor, IET Generation, Transmission & Distribution, 2019, vol. 13 Iss. 15, pp. 3378-3387.

(Continued)

*Primary Examiner* — Harry R Behm
(74) *Attorney, Agent, or Firm* — Procopio, Cory, Hargreaves & Savitch LLP

(57) ABSTRACT

A system (100) for stabilising a power grid (102), comprising a generator (104), configured to provide power to the power grid (102), the power having an active power component and a reactive power component, and a power line (106), configured to transmit power from the generator (104) to the power grid (102). The system (100) comprises a thyristor controlled braking resistor (TCBR) (108) arranged on the power line (106), and a capacitor (110) electrically connected in series with the TCBR (108). The TCBR (108) absorbs at least a portion of the reactive power component from the generator (104) during a fault on the power line (106) and the capacitor (110) is configured to compensate for the at least a portion of the reactive power component absorbed by the TCBR (108).

8 Claims, 3 Drawing Sheets

(56) References Cited

U.S. PATENT DOCUMENTS

| | | | |
|---|---|---|---|
| 2001/0043111 A1* | 11/2001 | Gonthier | H03K 17/168 |
| | | | 327/531 |
| 2009/0079191 A1* | 3/2009 | Mari | H02P 9/14 |
| | | | 290/43 |
| 2009/0200872 A1 | 8/2009 | Johansson | |
| 2010/0001698 A1* | 1/2010 | Johnson | H02J 3/24 |
| | | | 323/209 |
| 2010/0090538 A1* | 4/2010 | Larsen | H02J 3/00125 |
| | | | 307/105 |
| 2010/0133915 A1 | 6/2010 | Asplund et al. | |
| 2014/0055116 A1* | 2/2014 | Hosini | H02J 3/1807 |
| | | | 323/304 |

FOREIGN PATENT DOCUMENTS

| | | | | |
|---|---|---|---|---|
| CN | 105794066 A | | 7/2016 | |
| CN | 110492491 A | | 11/2019 | |
| CN | 111600328 A | * | 8/2020 | ............... H02J 3/36 |
| EP | 2093855 A2 | | 8/2009 | |
| JP | H0496625 A | | 3/1992 | |
| JP | 2001-119860 A | | 4/2001 | |
| JP | 2005-176585 A | | 6/2005 | |
| JP | 2015-228111 A | | 12/2015 | |

OTHER PUBLICATIONS

Saluja et al, "Novel Braking Resistor Models for Transient Stability Enhancement in Power Grid System", IEEE, 2013, 6 pages.

International Search Report and Written Opinion for the corresponding International Application No. PCT/EP2021/078192 dated Jul. 7, 2022, 8 pages.

International Preliminary Report on Patentability for the corresponding International Application No. PCT/EP2021/078192 dated Apr. 26, 2023, 14 pages.

Iida et al., "Experimental Study on Improvement of Transient Stability with Braking Resistor", Electronics and Communication in Japan, vol. 91, No. 8, 2008, XP1523125A, DOI: 10.1002/ECJ. 10130, Japan, pp. 11-19.

Zhang Xueyan et al., "Wide Area Coordinated Optimization Method of Thyristor Controlled Braking Resistor Controllers", Transactions of China Electrotechnical Society, vol. 23 No. 6, Jun. 2008, 6 pages.

* cited by examiner

CAPACITOR COMPENSATED THYRISTOR CONTROLLED BRAKING RESISTOR

CROSS-REFERENCE TO RELATED APPLICATIONS

This application is US National Stage of International Patent Application PCT/EP2021/078192, filed Oct. 12, 2021, the contents of which is incorporated herein by reference.

TECHNICAL FIELD

The present disclosure relates to fault tolerance in power grids. More particularly, the present disclosure relates to thyristor controlled braking resistors for use during a fault in a power grid.

BACKGROUND

Electrical power grids comprise electrical generators servicing a load with electrical power. Generators are typically connected to power grids with power lines, i.e. electrical cables that transmit the power from the generators to the load of the power grid. For example, in radial networks, single generators feeding the load via a single power line.

Although power lines are often configured for resilience, the load of the generator can quickly be lost if a power line fault occurs. In such situations, the generators may trip, be damaged and/or be required to be shut down.

A braking resistor may be used as a temporary load for the generator in the case of a fault, to avoid the generator tripping until the power line can be repaired and/or reconnected. If the generator is to be shut down, this can be done in a controlled way by ramping down the power using a thyristor controlled braking resistor (TCBR).

The TCBR will consume reactive power when operating, due to the internal inductance of the resistors, the reactive power consumption of the thyristors when operating with a delay in firing, and also due to the reactive power consumption of the transformer, if one is used. This reactive power consumption may decrease the voltage on the grid, which in turn can force the generator to trip on undervoltage. An example of such a TCBR is disclosed in U.S. Pat. No. 5,198,745.

The reactive power absorbed by the TCBR may be compensated for by shunt capacitor banks, either mechanically switched or thyristor switched, thus mitigating the risk of the generator tripping.

SUMMARY OF INVENTION

Aspects of the present disclosure are provided to improve the stability of power grids using TCBRs.

According to an aspect of the present disclosure, there is provided a system for stabilising a power grid, comprising a generator configured to provide power to the power grid and a power line, configured to transmit power from the generator to the power grid.

The power grid may be a radial power grid, for example having single generators feeding the load of the power grid via a single power line each. Alternatively, the power grid may be a ring or a mesh network. The power grid provides power to a load, which may be made up of a combination of loads such as a city's power network, a commercial estate, or some other load or a combination thereof.

The generator may be any electrical generator suitable for providing electrical power to the load, so as to satisfy the demands of the load, which may vary greatly over the course of a day or a year. The generator may be driven by a renewable source such as a wind turbine or a hydroelectric system, or some other source of electrical power. The power line is configured so as to deliver the power generated by the generator to the power grid, more specifically the load on the power grid.

According to this aspect of the present disclosure, the system further comprises a thyristor controlled braking resistor (TCBR) arranged on the power line and configured to absorb power from the generator during a fault on the power line. The TCBR may comprise a braking resistor configured to draw an electrical load from the generator and a thyristor electrically connected in series with the resistor, configured to control the electrical load drawn by the braking resistor. In general, the TCBR advantageously provides controllability of the current and the power drawn from the generator, which can be controlled to a desired setpoint (e.g. through connection with a control unit or some other means).

The power generated by the generator has an active and a reactive component, and the TCBR is configured, in its operation, to absorb at least a portion of the reactive power component due to the internal inductance of the resistors and/or the reactive power consumption of the thyristors when operating with a delay in firing.

Therefore, to compensate for this reactive power absorption by the TCBR, it is proposed as part of this aspect of the present disclosure to provide a capacitor electrically connected in series with the TCBR, wherein the capacitor is configured to compensate for the at least a portion of the reactive power component absorbed by the TCBR. The reactive power can be compensated to the degree needed, dependent on the current in the TCBR.

The reactive power consumed by the TCBR depends on several factors, such as the transformer reactance, inductance in the TCBR circuit, and the control of the thyristors, for example. From a general perspective, the compensation provided by the capacitor may be represented as $$k = \frac{X_C}{X_L},$$

where $X_C$ is the reactance of the capacitor and $X_L$ is the inductive reactance of the load. The specifics of the mathematical relationship between the reactive power absorbed by the TCBR and compensated for by the capacitor will vary between implementations.

The provision of a series capacitor in this manner improves upon previous solutions such as shunt resistors because the drawback of shunt resistors, for example, is that the reactive power will be compensated in discrete steps, thus causing undesirable steps in the grid voltage. The use of a capacitor will not cause such steps in the grid voltage as the compensation is scaled according to the current in the TCBR.

In some examples, the system may further comprise a transformer connected on the power line between the generator and the power grid.

In such examples, the capacitor may be arranged between the transformer and the power grid, i.e. on the primary side of the transformer. When the capacitor is arranged on the primary side of the transformer, the voltage on the transformer may then increase with the current, and the transformer voltage rating may be increased as well. The series capacitor may preferably be insulated for the high-voltage level of the grid.

Alternatively, the capacitor may be arranged between the transformer and the TCBR, i.e. on the secondary side of the transformer. When the capacitor is arranged on the secondary side of the transformer, this advantageously gives lower insulation requirements of the series capacitors and the transformer, but the voltage of the thyristor valves may increase with the current. The optimization of the thyristor valves and the resistors may then become more complex.

The particular placement of the capacitor relative to a transformer may be system dependent. The reactive power compensation can also be provided by the series capacitor with a TCBR system that does not include transformers.

According to some example implementations, the system may further comprise a bypass switch configured to bypass the capacitor and/or a varistor electrically connected in parallel with the capacitor, for further reliability of the system.

Whilst the invention is susceptible to various modifications and alternative forms, specific embodiments are shown by way of example in the drawings as herein described in detail. It should be understood, however, that the detailed description herein and the drawings attached hereto are not intended to limit the invention to the particular form disclosed. Rather, the intention is to cover all modifications, equivalents, and alternatives falling within the scope of the appended claims.

Any reference to prior art documents or comparative examples in this specification is not to be considered as an admission that such prior art is widely known or forms part of the common general knowledge in the field.

As used in this specification, the words "comprise", "comprising", and similar words are not to be interpreted in the exclusive or exhaustive sense. In other words, they are intended to mean "including, but not limited to".

BRIEF DESCRIPTION OF THE DRAWINGS

One or more embodiments will be described, by way of example only, and with reference to the following figures, in which.

DETAILED DESCRIPTION

The present invention is described in the following by way of a number of illustrative examples. It will be appreciated that these examples are provided for illustration and explanation only and are not intended to be limiting on the scope of the present invention. Instead, the scope of the present invention is to be defined by the appended claims. Furthermore, although the examples may be presented in the form of individual embodiments, it will be recognised that the invention also covers combinations of the embodiments described herein.

Figure 1:
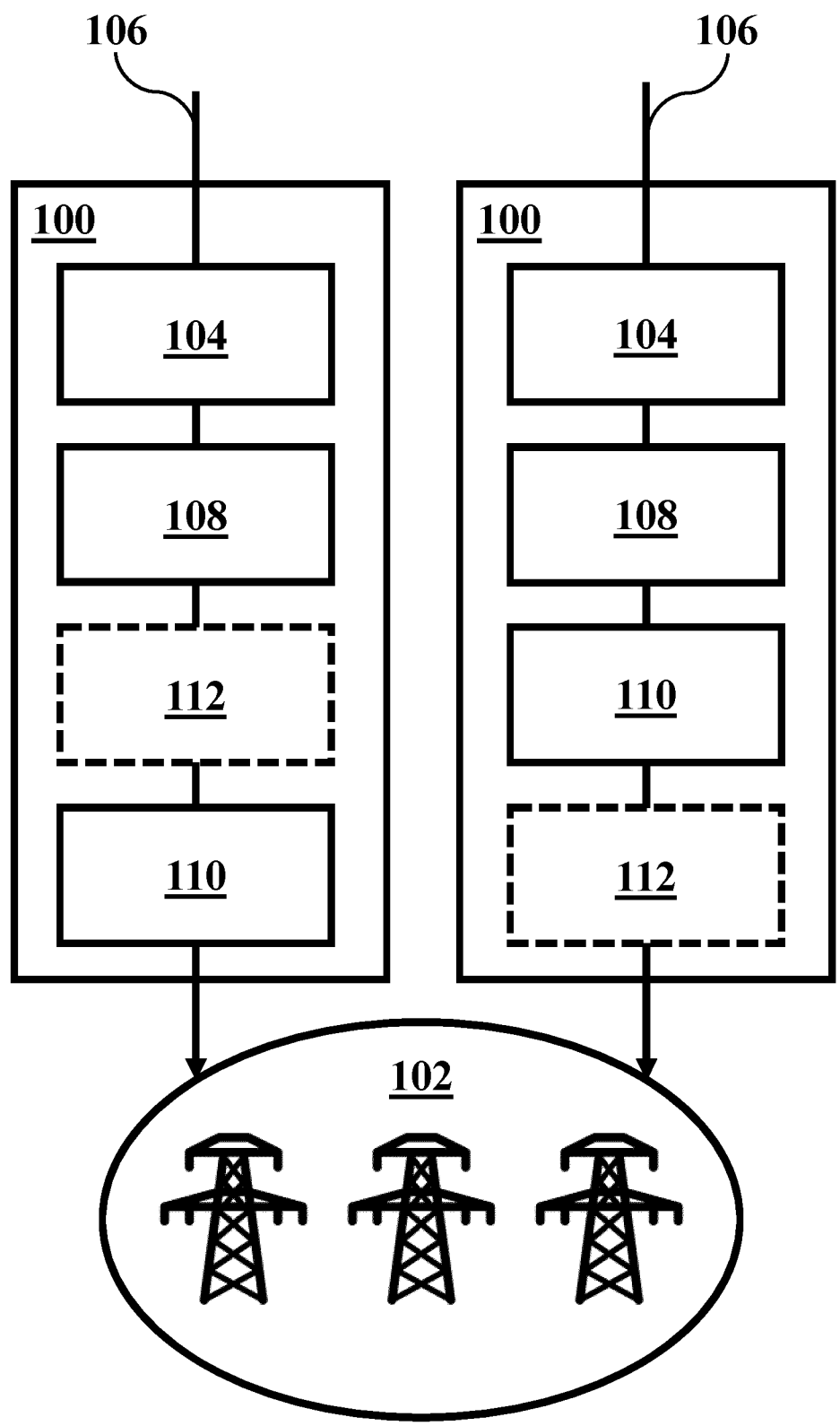
FIG. 1 schematically shows a system for stabilizing a power grid, according to an embodiment.

FIG. 1 shows an example system 100 for stabilising a power grid 102, according to embodiments.

The illustrated systems 100 are similar at least in that they comprise a generator 104 configured to provide power to the power grid 102, the power having an active power component and a reactive power component. The generator 104 is connected to the power grid 102 via a power line 106, which may be one or a plurality of power lines, depending on the particular implementation.

Arranged on the power line 106, in series with the generator 104, is a thyristor controlled braking resistor (TCBR) 108. An example configuration of the TCBR 108 is described in relation to FIG. 3 below.

The TCBR 108 acts as a temporary load for the generator 104, for example in the case of a fault on the power line 106 that leads to a disconnection from the power grid 102. The TCBR 108 is controllable (e.g. via a control unit connected to the thyristors of the TCBR 108) so as to control the power drawn from the generator 104, for example to a desired maximum or minimum set point, according to the particular requirements of the system 100.

As will be appreciated, the power from the generator 104 will have an active power component and a reactive power component, and the braking resistor comprised in the TCBR 108 is primarily configured to consume the active power component. If too much of the reactive power component is consumed (or stored without return) by the components of the TCBR 108, or other components in the system 100, then the voltage on the power grid 102 may undesirably be reduced. This may, in turn, cause the generator 104 to trip on undervoltage.

The systems 100 further comprise a capacitor 110 electrically connected in series with the TCBR 108. The capacitor 110 being placed in series in this manner allows the capacitor 110 to compensate for the consumption of the reactive power by the components of the TCBR 108. Thus, the voltage on the power grid 102 does not undesirably reduce and the generator 104 has less risk of tripping on undervoltage. Consequently, the system 100 is made more robust and reliable.

The configuration of the capacitor 110 is discussed in more detail below in relation to FIG. 2.

In some examples, the systems may comprise a transformer 112 connected on the power line 106 between the generator 104 and the power grid 102. The two illustrated systems 100 differ in the potential placement of the capacitor 110 relative to the transformer 112. The transformer 112 may have a high-voltage (HV) primary side, and a medium-voltage (MV) secondary side, the voltage being stepped up from the MV secondary side to the HV primary side before being distributed to the power grid 102.

The capacitor 110 may either be arranged in series on the primary HV side of the transformer 112 or in series on the secondary MV side of the transformer 112. Put another way, the capacitor 110 may be arranged between the transformer 112 and the power grid 102, or between the transformer 112 and the TCBR 108.

In the case where the capacitor 110 is arranged in series on the primary side of the transformer 112, the voltage on the transformer 112 may increase with the current, and the voltage rating of the transformer 112 can be increased accordingly.

Preferably, to accommodate for the placement of the capacitor 110 on the HV side of the transformer 112, the series capacitor 110 may be insulated for the HV level of the power grid 102.

In the case where the capacitor 110 is arranged in series on the secondary side of the transformer 112, the voltage of the thyristor valves in the TCBR 108 will increase with the current. Thus, the optimization of the thyristor valves and the resistor(s) in the TCBR 108 may become more complex. However, advantageously, there may be lower insulation requirements for the series capacitor 110 due to its placement on the MV side of the transformer 112.

Whether the capacitor 110 is placed on the HV or MV side of the transformer 112 may be system dependent. Moreover, as indicated by the dotted lines in FIG. 1, the transformer 112 may not be included in the system 100. Even without a transformer 112, the capacitor 110 may still provide reactive power compensation for a system 100 having a TCBR. However, when a transformer 112 is included, the transformer 112 may contribute to the consumption (or storage without return) of reactive power.

Figure 2:
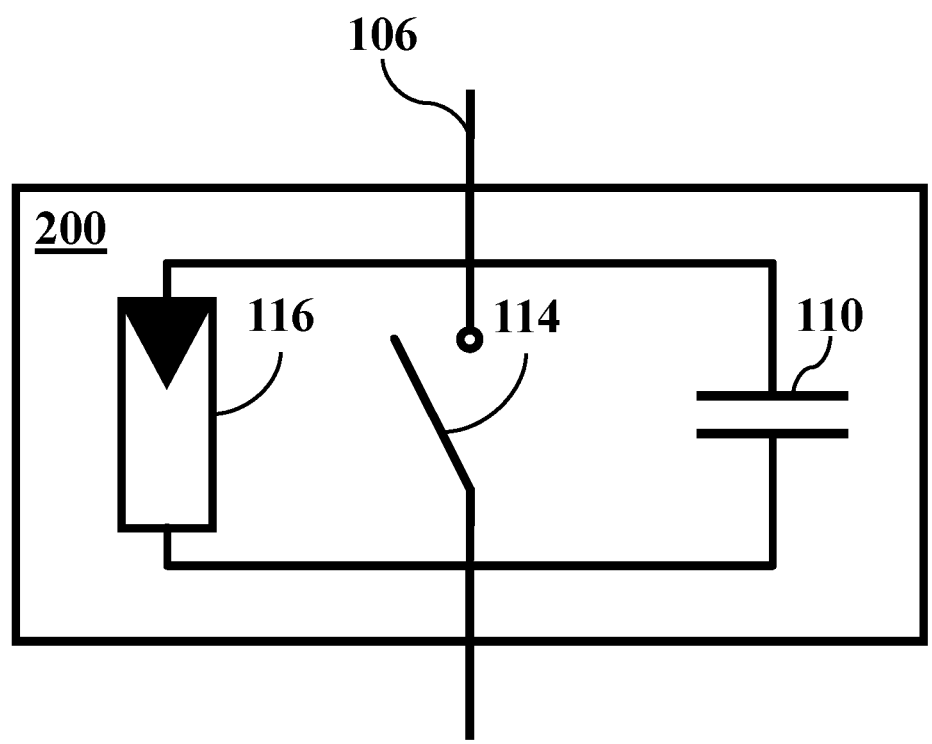
FIG. 2 schematically shows an example configuration for a capacitor for use in the system of FIG. 1.

FIG. 2 schematically shows an example configuration 200 for a capacitor 110 for use in the system of FIG. 1.

In the illustrated configuration 200, the capacitor 110 may have a bypass switch 114 arranged to bypass the capacitor 110, for example arranged across the terminals of the capacitor 110 on the power line 106. Thus, the reactive power compensation of the capacitor 110 can be added and removed by control (e.g. remote control) of the bypass switch 114.

The bypass switch 114 may take any form suitable to enable the electrical bypass of the capacitor 110 upon closing of the bypass switch 114, whilst allowing electrical flow through the capacitor 110 whilst the bypass switch 114 is open. The provision of the bypass switch 114 may further improve the safety of the system 100, and/or the controllability of the system 100.

Additionally or alternatively, the configuration 200 may further comprise a varistor 116 arranged in parallel with the capacitor 110. The varistor 116 may advantageously provide further protection for the capacitor 110, thus further improving the safety and reliability of the system 100.

The configuration 200 may include one or both of the bypass switch 114 and the varistor 116, according to the required specifications of the system 100, e.g. in terms of safety, rating, and the like.

Figure 3:
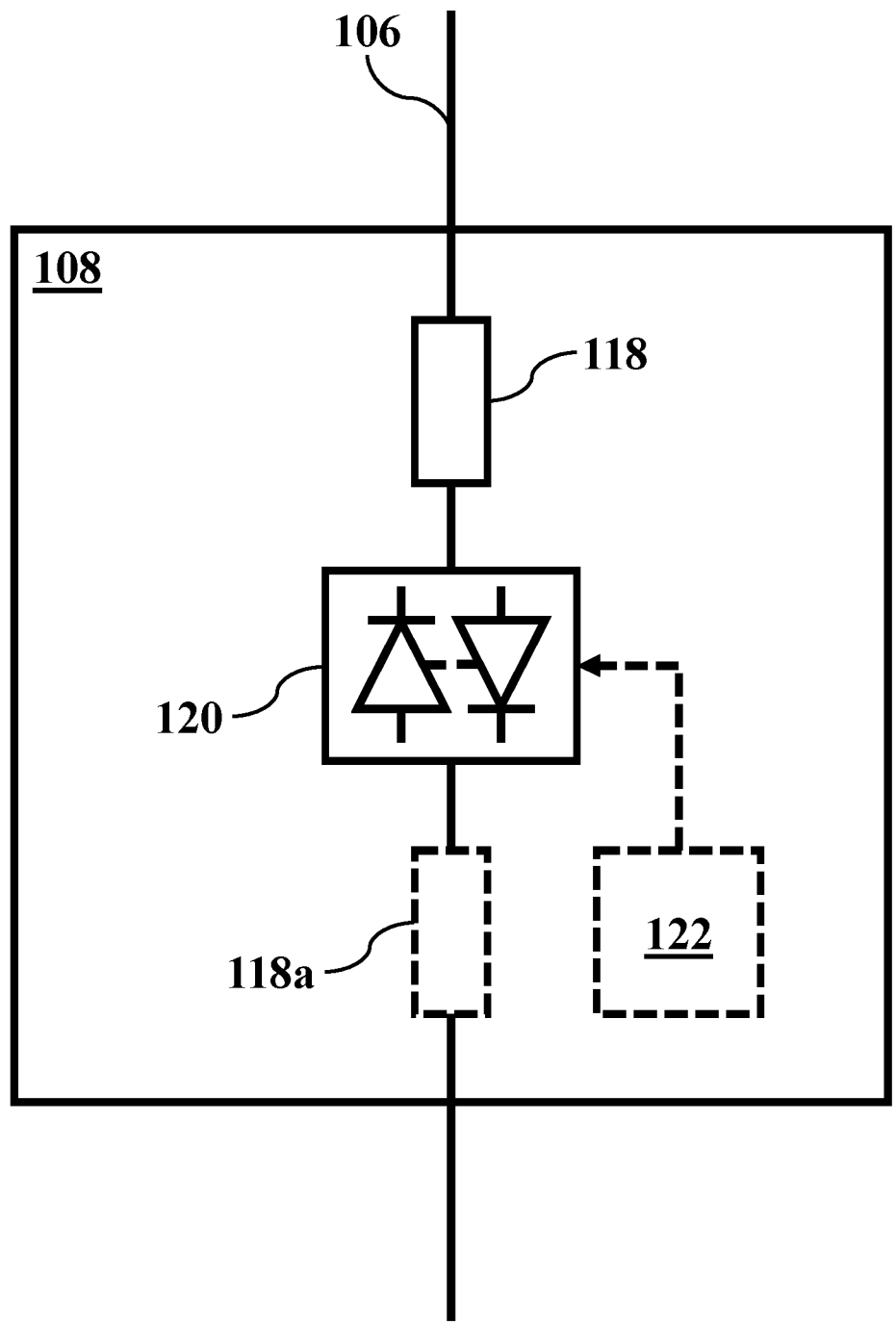
FIG. 3 schematically shows an example configuration for a thyristor controlled braking resistor for use in the system of FIG. 1.

FIG. 3 schematically shows an example configuration for a TCBR 108 for use in the system 100 of FIG. 1.

According to the illustrated example, the TCBR 108 may comprise a braking resistor 118 configured to draw an electrical load from the generator 104 and a thyristor 120 electrically connected in series with the resistor 118 and configured to control the electrical load drawn by the braking resistor 118.

The thyristor 120 may be one or more thyristors, depending on the required specifications for the TCBR 108. For example, the thyristors 120 may comprise a plurality of thyristors 120 arranged in series to increase the voltage capability.

As mentioned above, although the primary purpose of the braking resistor 118 when drawing an electrical load is to consume active power from the generator 104 (e.g. when the TCBR 108 is serving as a temporary load for the generator 104), the TCBR 108 may also store or consume reactive power.

The TCBR 108 may consume a relatively large amount of reactive power (e.g. relative to an ideal reactive power consumption of zero) during its operation. This may be due to the internal inductance of the braking resistor 118 and/or the reactive power consumption of the thyristor(s) 120 when there is a delay in firing the TCBR 108.

The amount of reactive power consumed by the TCBR 108 will be compensated for proportionally as a result of the provision of the series capacitor 110. Thus, the compensation of reactive power by the capacitor 110 scales with the consumption of reactive power by the TCBR 108. As a consequence, the generator 104 can be prevented from tripping, and the voltage of the power grid 102 is not irregularly varied.

In some examples, the braking resistor 118 may comprise a further resistor 118a, so as to be comprised of a pair of resistors 118, 118a. In such examples, the thyristor(s) 120 may be arranged and electrically connected between the pair of braking resistors 118, 118a.

The provision of the additional resistor 118a on the other side of the thyristor(s) 120 allows for the resistance to be split into parts, i.e. two parts, which advantageously limits the short-circuit current in the valves of the thyristor(s) 120.

In some further examples, a reactor (not shown) may be included in series with the thyristor(s) 120, thus providing an additional reactance, to limit the derivate of the current through the valves of the thyristor(s) 120.

The resistor 118 and/or 118a may advantageously be chosen for a lower internal inductance (thus reducing reactive power consumption, for example), a small temperature dependency (thus preventing overheating during operation, for example), and a high overload capability (for better resilience, for example).

Although only one additional resistor 118a is shown, it will be appreciated that there may be a greater number of additional resistors provided, for example on either side of the thyristor(s) 120. Moreover, as illustrated by the dotted lines in FIG. 3, there may be no additional resistor 118a provided.

The relationship between the resistance of the resistor(s) 118, 118a and the capacitance of the capacitor 110 may be determined based on the selected voltage to which the TCBR is connected (i.e., the secondary voltage of the transformer 112) and/or the reactive power that can be tolerated in the system 100 during operation.

In some examples, the TCBR 108 may further comprise a control unit 122 configured to control the thyristor(s) 120. There may be one control unit 122 provided for each thyristor 120, for example.

The control unit 122 may itself be locally or remotely controlled, may locally or remotely control the thyristor(s) 120, and allows for the TCBR 108 to control the amount of power drawn from the generator 104 when the TCBR 108 is serving as a temporary load for the generator 104. For example, the TCBR 108 may be controlled, via the control of the thyristors 120 by the control unit 122, to a desired set point for the electrical load drawn. This set point may be predetermined or dynamically determined by some calculation means, according to the particular requirements for the system 100.

It will be appreciated that, unless explicitly stated otherwise, various components and features disclosed in the foregoing description may be implemented separately or in combination. Furthermore, it will be appreciated that the foregoing disclosed embodiments are not exhaustively listed, and there may be further example embodiments within the scope of the appended claims. In any event, it is intended for the scope of protection to be defined by the appended claims.

The invention claimed is:

1. A system for stabilising a power grid, comprising:
   a generator, configured to provide power to the power grid, the power having an active power component and a reactive power component;
   a power line, configured to transmit power from the generator to the power grid;

a thyristor controlled braking resistor (TCBR) arranged on the power line and configured to control a power drawn from the generator; and a capacitor electrically connected in series with the TCBR between the generator and the power grid;

wherein the capacitor is configured to compensate for at least a portion of a reactive power component absorbed by the TCBR.

2. The system according to claim 1, further comprising:

a transformer connected on the power line between the generator and the power grid;

wherein: the capacitor is arranged between the transformer and the TCBR, or between the transformer and the power grid.

3. The system according to claim 1, further comprising: a bypass switch configured to bypass the capacitor.

4. The system according to claim 1, further comprising: a varistor electrically connected in parallel with the capacitor.

5. The system according to claim 1, wherein the TCBR comprises:

a braking resistor configured to draw an electrical load from the generator;

a thyristor electrically connected in series with the resistor and configured to control the electrical load drawn by the braking resistor.

6. The system according to claim 5, wherein: the thyristor is configured to be controlled by a control unit.

7. The system according to claim 5, wherein:

the braking resistor is comprised of at least two resistors; and the thyristor is arranged between the at least two resistors.

8. A power grid comprising the system of claim 1.

* * * * *